Aug. 14, 1962 H. P. FREEDMAN 3,049,706

DATA EXCHANGE SYSTEMS

Filed April 7, 1959 3 Sheets-Sheet 1

INVENTOR:
HAROLD PHILIP FREEDMAN
BY
Richardson, David and Nordon
ATTYS.

Aug. 14, 1962 H. P. FREEDMAN 3,049,706

DATA EXCHANGE SYSTEMS

Filed April 7, 1959 3 Sheets-Sheet 2

INVENTOR:
HAROLD PHILIP FREEDMAN
By
Richardson, David and Nordon
ATTY'S.

Aug. 14, 1962 H. P. FREEDMAN 3,049,706

DATA EXCHANGE SYSTEMS

Filed April 7, 1959 3 Sheets-Sheet 3

INVENTOR:
HAROLD PHILIP FREEDMAN
BY
Richardson, David and Nordon
ATTY'S.

3,049,706
DATA EXCHANGE SYSTEMS

Harold Philip Freedman, Twickenham, England, assignor to Avel Corporation Geneva, Geneva, Switzerland Filed Apr. 7, 1959, Ser. No. 804,763
Claims priority, application Great Britain Apr. 11, 1958
7 Claims. (Cl. 343—6.5)

This invention concerns improvements in data exchange systems and has particular, but not exclusive, reference to the data exchange systems and apparatus described in the specification of copending application Serial Number 690,377; J. Vielle filed October 15, 1957, for Method and Apparatus for Data Exchange (now Patent No. 2,980,-908).

The invention is also particularly applicable to data exchange or telemetry systems in which one station interrogates and the other station replies giving the value of the particular data that it is desired to measure and exchange.

It is extremely desirable for many purposes, that the transmission or exchange of data should take place as rapidly as possible. The data should be expressed in the form of a code which may be impressed upon a suitable radio transmission (the term radio being used as widely as possible). The code may consist in varying a carrier frequency or a modulating frequency, or the code may be in pulse form wherein the length, position or amplitude of pulses determines the code. A modulating frequency or pulse code may be applied to a carrier as a frequency modulation or an amplitude modulation of a basic radio frequency. In any event it is desirable to use a code of simple form but one which, nevertheless, enables the data items to be encoded and decoded simply and rapidly.

It should also be understood that the transmission of data in accordance with the present invention can be carried out by means other than radio and may, for example, be carried out by means of wire or wave guide transmission or even visual light, infra-red or the like or sound waves.

In the transmission of data it is essential that there be a transmitting and a receiving station and in the present invention we are concerned chiefly with an arrangement where the transmitting station is controlled by the receiving station at least in so far as the transmission of data is concerned.

Thus a signal from the receiving station (hereinafter called the "interrogating station") may serve to initiate a transmission of the data from the transmitting station (hereinafter called the "responding station").

The coding used with this invention requires that the possible values of the data item be split into a number of discrete non-repeating coarse divisions each of which is split into a number of repeating fine divisions. Each coarse division is allocated a different code value whilst the code values for the fine divisions repeat in each coarse division. Thus any particular value of the data item is expressed by a code which consists of a coarse value and a fine value.

According to the present invention there is provided apparatus for transmitting the value of a variable parameter from a responder station to an interrogating station making use of a two-part code in which the value is represented by one of a number of non-repeating coarse divisions and one of a number of repeating fine divisions, such apparatus comprising, at the interrogating station, means for transmitting and interrogation signal coded with one of the two code parts; in the responding station, means for receiving the interrogation signal and means for determining whether substantial identity exists between the code part received and the same code part representing the value of the variable parameter, and means controlled by the finding of identity to activate apparatus for transmitting a response signal coded with the other code part representing the value of the variable parameter to be transmitted.

For some purposes it may be more convenient to interrogate with the coarse values, but for other purposes it will be more convenient to interrogate with the fine values. Thus to take a particular example the interrogating station interrogates using a particular fine code value and if the data item at the responding station has that fine code value the responding station responds by transmitting the coarse code value, so that the interrogating station knows both parts of the code determining the data item. This invention is specially useful in cases where the interrogating station is interested in the value of the data item at the responding station only if the value of the data item lies within certain narrow limits. In this case a single interrogation with, for example, the coarse code value corresponding to the value of interest, will evoke a response only if the data item has the same coarse code value, the response being coded with the fine code value.

One particular application of this invention, in accordance with the said copending applications, is in the transmission of height information for two aircraft in the avoidance of collision or for ground control purposes. The primary advantage is that the invention provides a relatively simple method for exchanging the data, but nevertheless gives a highly accurate result. Thus the coarse code may consist of ten divisions and the fine code also of ten divisions giving a total of one hundred possible values of coding. Furthermore, it is possible, by very simple apparatus, to select at the responder only those interrogations which are coded with a value corresponding to the value at the responder, e.g. the responder will only reply to interrogations coming from aircraft at approximately the same height. Moreover, since the code is simple the invention may be applied to transmission systems where a more complex coding would be difficult to accommodate.

In order that this invention may more readily be understood certain embodiments of the same will now be described with reference to the accompanying drawings and as applied to the exchange of height data in two aircraft.

Figure 1:
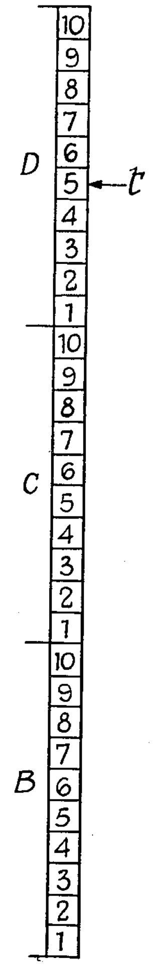
FIGURE 1 illustrates the coding in a simple form.

Referring firstly to FIGURE 1, it will be seen that the total height band which is to be encoded is divided into a number of divisions indicated by the letters B to D forming coarse code values and the fine coding is provided by dividing each of the coarse code values into ten intervals represented by the numbers 1 to 10 forming fine code values. Thus a combination of a single letter and a single number (for the number 10 may be represented equally well by zero) gives a unique code value to each fine height division. It may be supposed that an aircraft is at a height represented by the arrow *t*, in which case the associated code value is D5, and the interrogation may be by the letter D, in which case the response would be by the number 5 so as to fix completely the value of the data item. Alternatively it will be appreciated that the interrogation may be by the number 5 and the response by the letter D. In the case of interrogation from a ground position, where it is desired to fix the actual height of an aircraft, the interrogation may conveniently be arranged to sweep through all possible values of the interrogation code, but in the case of two aircraft exchanging data, where it is only desired to know whether the second aircraft is at the same height, the interrogating aircraft may interrogate using the code corresponding to its own height.

Figure 2:
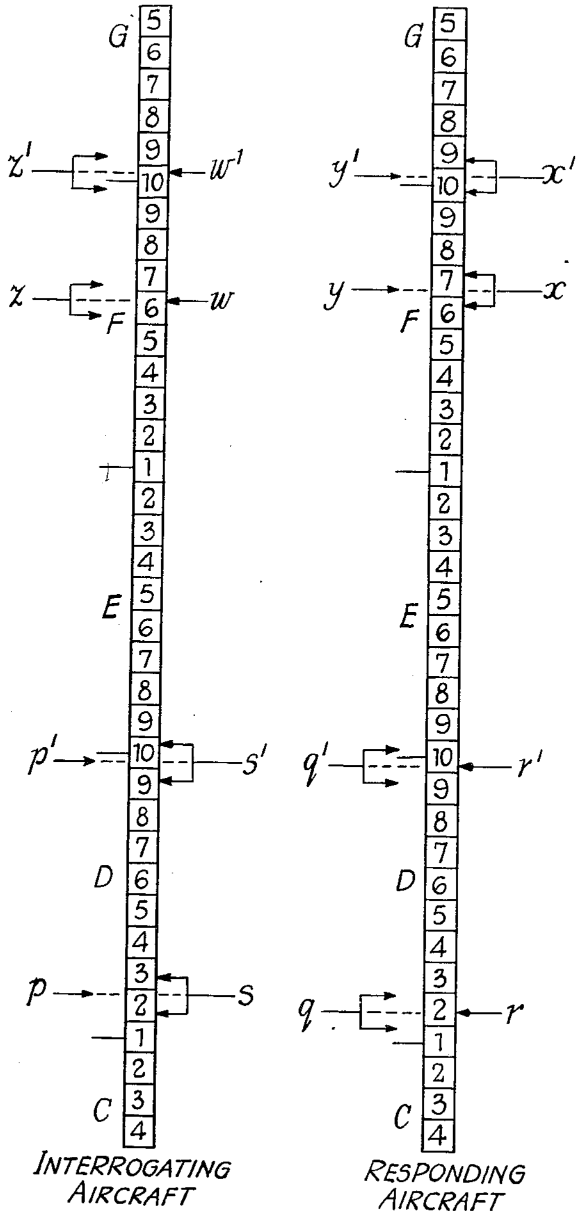
FIGURE 2 illustrates a modified form of the coding.

It may be desirable, under certain circumstances, to ascertain not whether the data item is exactly the same in two aircraft but whether it is approximately the same, and under these circumstances the form of coding shown in FIGURE 2 may be more suitable. In this arrangement the coarse code values follow the previous simple sequence, but the fine code values are cyclic, so that the fine code values alternately increase and decrease, with adjacent fine code values always differing by only one code value and each fine code value appearing only once in each coarse code division.

With reference to FIGURE 2 it will be assumed in the first instance, that an interrogating aircraft is at a height $p$ and that a responding aircraft is at a height $r$. The interrogating aircraft interrogates with the coarse code value D which corresponds to the height $p$ and the responding aircraft, accepting the code value D since it lies within the range of code values encompassed by an input selector $q$, responds with the fine code value 2 which corresponds to its height $r$. The response code value 2 is then compared, in the interrogating aircraft, with a range of numbers embraced by an input selector $s$ and it is deduced that the actual value of the height $r$ (not the code value), lying within the range of fine code values encompassed by the selector $s$, is within a distance of the actual height $p$ corresponding to just over one fine height division. The range of the selector $s$ is such that if the height $p$ is exactly central of a fine division the selector $s$ encompasses both that division and the division on each side thereof so that if there is coincidence the height $r$ must lie within 1½ divisions of the height $p$. If the response is not accepted by the selector $s$, the height separation between $p$ and $r$ must be at least ½ division. Other ranges for the selector $s$ are possible.

It will be observed that the boundaries between the coarse divisions lie centrally of the fine divisions 1 or 10 as the case may be and we may now consider the case where the height $p'$ of the interrogating aircraft has the code values, as shown, D10. As before the interrogation is coded by the letter D and in this particular case the responding aircraft being at the height $r'$ the response is 10. Since the selector $s'$ covers, as can be seen, the divisions D9, D10 and E10, it can be deduced, if there is coincidence, that the height $r'$ is within 1½ divisions of $p'$. If on the other hand, an input selector $q'$ associated with the height $r'$ is wholly within the coarse division E, then there will be no response to an interrogation D showing that the height separation between $p'$ and $r'$ is at least a half division.

In the upper portion of FIGURE 2, interrogation is by the fine code value of the code and it is assumed that the interrogating aircraft is at the height $w$ and, therefore, interrogates with the code value 6. The responding aircraft accepts this interrogation if either end of its selector $x$ is in a division 6 and replies with the letter F which is accepted by the interrogating aircraft as its selector $z$ is in the coarse division F. It can, therefore, be deduced that a response would be given if the height $w$ were anywhere in division 6 and the height $y$ anywhere between 5½ and 7½ so that the maximum difference in heights is 1½ divisions and the minimum difference if there is no response is ½ division.

Taking a case near a coarse coding boundary, the interrogating aircraft is at the height $w'$ and interrogates by the fine code value 10. Since the responding aircraft is at the height $y'$ and its seletcor $x'$ covers the fine code values 9 and 10, the responding aircraft will reply with the coarse code value G if value $y'$ lies between the centre of 10 (the junction between divisions F and G) and 9½ in the division G. Since the height $w'$ may be anywhere in the division 10 for the interrogating aircraft to accept the coarse code value G, it can be deduced that the responding aircraft is at a height which is within 1½ divisions of $w'$.

On the other hand if the entire selector $z'$ is just within the coarse code value G so that the height $w'$ is in 9 whilst the selector $x'$ is in 10 and the height $y'$ is in F, the interrogating aircraft will get no response and it is clear that there is a minimum of ½ division spacing between $y'$ and $w'$.

Figure 3:
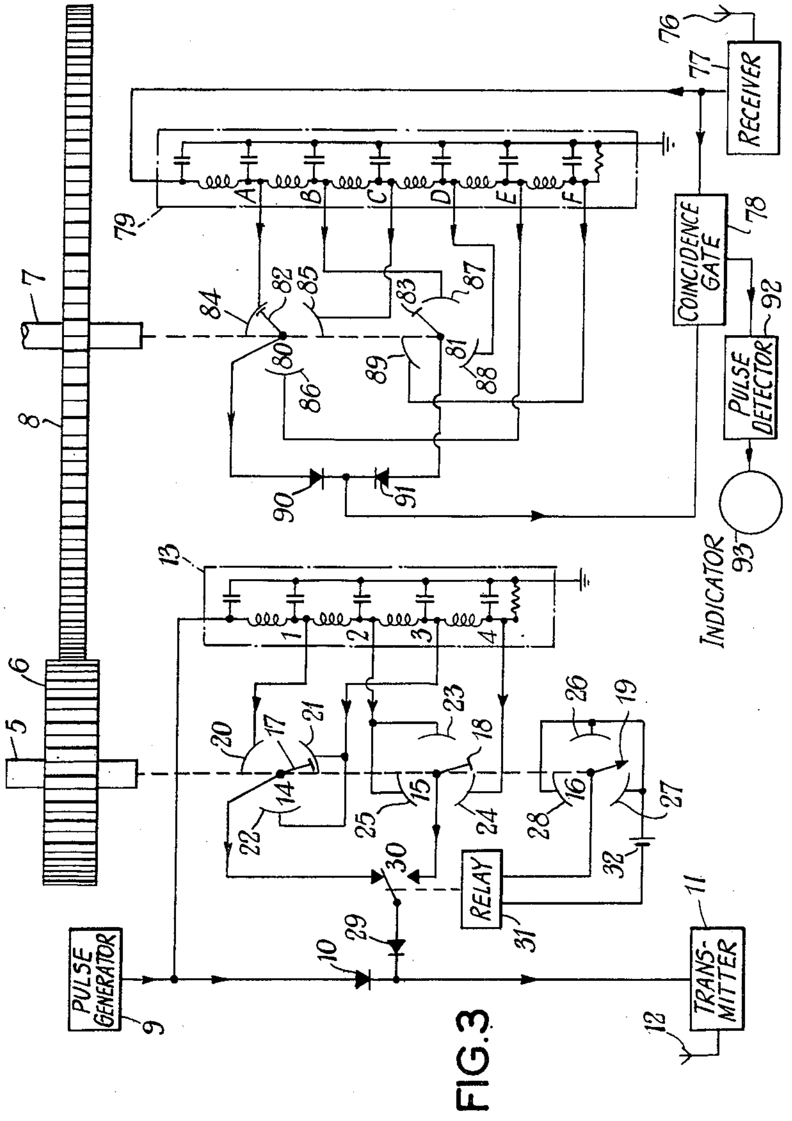
FIGURE 3 illustrates in diagrammatic form apparatus for an interrogator station using a pulse delay coding and FIGURE 4 illustrates in diagrammatic form apparatus for a responder station operating in conjunction with the apparatus of FIGURE 3.
Figure 4:
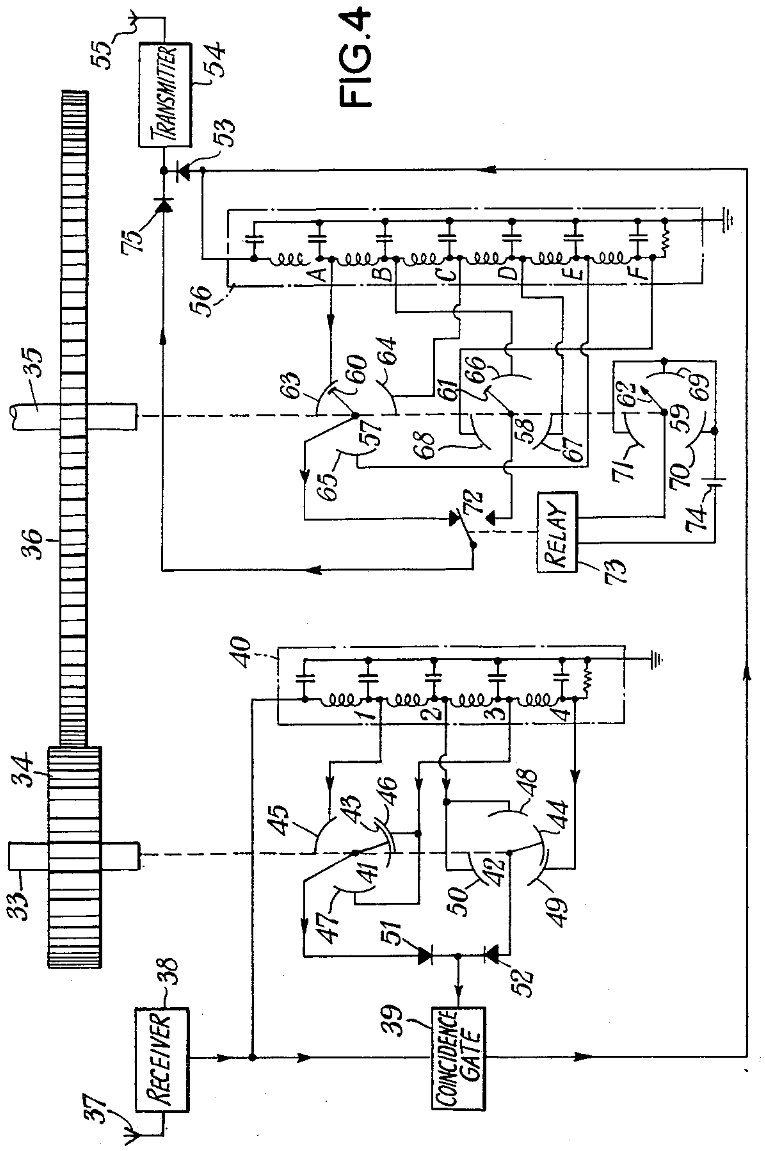

The equipment for carrying out the encoding and decoding and for controlling the interrogating and responding apparatus is illustrated in FIGURES 3 and 4. FIGURE 3 illustrates the interrogator and FIGURE 4 illustrates the responder and for the sake of convenience these will be considered as being in separate aircraft, although normally each aircraft would carry both equipments. The form of coding is that illustrated in FIGURE 2 but using a four-position fine code and a six-position coarse code, interrogation being by the fine code value.

The left-hand portion of the interrogator of FIGURE 3 is concerned with selecting and transmitting the fine code value corresponding to the height of the interrogating station and the left-hand portion of the responder of FIGURE 4 is concerned with the reception and comparison of this interrogating fine code value upon the basis of the height of the responding station. If the two fine code values are substantially the same, a pulse is passed to the right-hand half of FIGURE 4 to initiate the transmission of the coarse code value corresponding to the height of the responding station. The right-hand portion of the interrogator, see FIGURE 3, is concerned with receiving this coarse code value and comparing it with the coarse code value of the interrogating station to determine whether they are the same. In this way the interrogating station determines whether the responding station has substantially the same fine and coarse codings as itself, that is to say, whether it is at the same height. To enable both aircraft to determine whether there is substantial identity of height, both aircraft must carry the equipments of FIGURES 3 and 4.

In this embodiment the transmitted signals consist of pairs of radio frequency pulses, the separation between a pair of pulses being characteristic of a coarse or fine code value and the interrogator and responder are described as operating upon different radio frequencies so that the pulse separation for coarse and fine code values may cover the same range. However, if the same radio frequency is used for interrogation and response, then the range of separations for the coarse and fine code values must differ.

Now describing the apparatus in detail, in FIGURE 3 a shaft 7 is driven by means, not shown, so that its angular position corresponds to the height of the interrogating station, the total range of height corresponding to one complete revolution of the shaft 7. It is convenient to drive the shaft 7 from a height controlled servo mechanism in known manner. A second shaft 5 is driven through fixed gears 6 and 8 having a ratio of 1 to 3 so that the total range of height (corresponding to one complet revolution of the shaft 7) corresponds to three complete revolutions of the shaft 5.

The shaft 5 drives moving contacts 17, 18 and 19 of three selector switches 14, 15 and 16. The rotation of the shaft 5 causes the moving contact 17 to make and break with fixed contacts 20, 21 and 22 of the switch 14, each of these fixed contacts subtending 60° with a gap of 60° between them. The switch 15 has similar fixed contacts 23, 24 and 25 and the switch 16 has similar fixed contacts 26, 27 and 28, but the contacts 23 to 28 are located in positions corresponding to the gaps between the contacts 20 to 22.

A pulse generator 9 generates pulses at intervals which are not necessarily regular and each pulse passes through a diode 10 to key a transmitter 11 so that a pulse of radio frequency is produced and is radiated from an antenna 12.

Each pulse from the pulse generator 9 is also passed to a delay line 13, such delay line having four different tappings 1, 2, 3 and 4 giving four different delays corresponding to the four fine code values. The tappings 1, 2, 3 and 4 are connected to the fixed contacts of the switches 14 and 15 in the manner shown so that, in accordance with the angular position of the shaft 5 and thus in dependence upon the height of the interrogating station, the moving contacts 17 and 18 select tappings on the delay line 13 and pass delayed pulses to contacts 30 of a relay 31. The contacts 17 and 18 have an angular width sufficient to ensure that at least one of them is connected to the delay line 13 for all positions of the shaft 5, although it will be understood that in certain positions both contacts may be connected to the delay line. Furthermore, in dependence upon the angular position of the shaft 5 the moving contact 19 of the switch 16 which is connected in circuit with the relay 31 and a battery 32 makes or breaks the circuit to the relay which operates the change-over contacts 30 so that only one of the switches 14 and 15 is effectively connected to the delay line and thus only a single pulse can be passed through a diode 29 to the transmitter 11, this pulse being delayed with respect to the pulse passed through the diode 10 by a time representative of the fine code value for the height of the interrogating station. The pulse passing through the diode 29 to the transmitter 11 causes a second pulse at radio frequency to be radiated from the antenna 12.

Now referring to FIGURE 4, there is there illustrated a shaft 35 driven so that its angular position corresponds to the height of the responding station and a shaft 33 driven through the 3:1 ratio gears 36 and 34 in the same way as in FIGURE 3.

If it is assumed that the responding station is within range of the interrogating station, the pulses transmitted from the antenna 12 will be picked up by an antenna 37 and passed to a receiver 38 and thence, after demodulation, to the first input of a coincidence gate 39 and a delay line 40 which has four tappings.

The shaft 33 drives moving contacts 43 and 44 of switches 41 and 42 which switches have fixed contacts 45 to 50 connected to the tappings 1 to 4 of the delay line 40 substantially as described with reference to the switches 14 and 15. The moving contacts of the switches 41 and 42 are connected by diodes 51 and 52 to the second input of the coincidence gate 39. Thus depending upon the height of the responding station a delayed pulse will be generated and will be transmitted to the coincidence gate 39.

If the two stations of FIGURES 3 and 4 are exactly at the same height the fine code values will be the same and in that case the second pulse fed to the first input of the coincidence gate 39 will coincide with the first pulse passed through and delayed by the delay line 40 and fed to the second input of the coincidence gate. Thus the coincidence gate 39 will produce an output pulse.

The moving contacts 43 and 44 each subtend a relatively large angle so that, except in positions corresponding exactly to the middle of a fine code value, both these contacts 43 and 44 will make contact and pulses from two adjacent tappings of the delay line 40 will be fed to the coincidence gate. Thus in the position illustrated, the contact 43 makes with the contact 46 connected to the tapping 3 and the contact 44 makes with the contact 49 connected to the tapping 4 and in consequence two pulses corresponding to fine code values 3 and 4 will be fed to the coincidence gate. This gives the spread of connection described with reference to the selectors of FIGURE 2 and allows for the detection of aircraft at approximately the same height as indicated by their fine code values.

Each output pulse from the coincidence gate 39 is passed via a diode 53 to key a transmitter 54 operating upon a second radio frequency and thus a pulse at this second radio frequency is radiated from an antenna 55.

The pulse from the coincidence gate is also passed to a delay line 56 having six tappings A to F corresponding to the six coarse code values and these six tappings are connected as shown to fixed contacts 63 to 68 of two selector switches 57 and 58, these selector switches having their moving contacts 60 and 61 driven by the shaft 35. As in the case of the switches 14 and 15 the moving contacts 60 and 61 have a sufficient angular width to ensure that at least one of them is connected to the delay line 56 for all positions of the shaft 35 and this shaft 35 also drives a moving contact 62 of a switch 59 having three fixed contacts 69 to 71 connected in series with a relay 73 and a battery 74. The moving contacts 60 and 61 are connected to a change-over contact 72 operated by the relay 73 so that, in effect, only one of the tappings A to F can ever be connected into the circuit. In consequence and in dependence upon the angular position of the shaft 35, a pulse delayed by one of the coarse code values A to F is passed through a diode 75 to the transmitter 54, this pulse causing the radiation of a second pulse on the second radio frequency from the antenna 55, such second pulse being delayed by a time corresponding to the coarse code value.

Referring again to FIGURE 3, these two pulses upon the second radio frequency are picked up by an antenna 76 and passed to a receiver 77 to produce two demodulated pulses; these two pulses being passed to the first input of a coincidence gate 78 and to the input of a delay line 79 having six tappings A to F. The six tappings of the delay line 79 are connected to fixed contacts 84 to 89 of two selector switches 80 and 81, the selector switches having moving contacts 82 and 83 driven by the shaft 7. The moving contacts 82 and 83 have sufficient angular width to ensure that at least one of them is making contact and in certain positions both moving contacts may engage with fixed contacts to give the selector function described previously.

If the interrogating and responding stations are at the same height, the coarse code values will be the same for both aircraft and in that case the second pulse fed to the coincidence gate from the receiver 77 will coincide with the first pulse fed to the coincidence gate 79 via diodes 90 and 91 from the selector switches 80 and 81 and the delay line 79 so that the coincidence gate 78 will produce an output pulse, such output pulse being detected by a pulse detector 92 and fed to an indicator 93 to activate the same to show that there is a second aircraft at approximately the same height.

If the two aircraft are at heights which are only slightly different, it is possible, as explained earlier with reference to FIGURE 2, that they should have different values for the coarse code, but the same value for the fine code, in such a case the response being coded with a coarse code value adjacent to that of the interrogating station. In order to provide for a positive response under these circumstances, the moving contacts 82 and 83 are of such a width that when the shaft 7 is in a position corresponding to a change in coarse code value, both these moving contacts make upon fixed contacts connected to adjacent coarse code values so that a pulse entering the delay line 79 will be fed from two tapping points via the diodes 90 and 91 to the coincidence gate 78 to produce two delayed pulses. Thus coincidence will occur in the coincidence gate.

Thus it will be understood that a response is given if the two fine code values are identical and also if the fine code value of the interrogating aircraft is adjacent to that of the responding aircraft. The response is coded with the coarse code value and near identity of height is indicated in the interrogating aircraft if the two coarse code values are the same or if the coarse code values are adjacent and the fine code value is that corresponding to an end of a coarse code section.

For the sake of convenience this description has been made with reference to step-wise changes in coding, but it should be understood that either or both of the coarse and fine code values may be continuously variable.

Moreover, although this invention has been described with reference to a two-part code for a single parameter, it should be understood that it is equally applicable to one part coding for two parameters where the interrogating station is interested only in the case that the two parameters each have a near identity with the same parameter at the responding station. In such a case the interrogation will be by means of a code value associated with one parameter, whilst the response will be by the code value associated with the other parameter.

I claim:

1. Apparatus for transmitting the value of a single variable parameter from a responder station to an interrogator station making use of a two-part code in which the value is represented by one of a number of non-repeating coarse divisions and one of a number of repeating fine divisions: such apparatus comprising, at the interrogator station, coding means to code a signal with one of the two code parts and transmitting means to transmit said coded signal; and at the responder station, means for receiving said coded signal, means to determine whether substantially identity exists between the code part identifying the received signal and the same code part representing the value of the variable parameter at the responding station, means to code a response signal with the other code part representing the value of the varible parameter to be transmitted, means to transmit such response signal and means effective to control such transmitting apparatus to activate same only on the finding of substantial identity and, in the interrogator station, means to determine whether substantial identity exists between the code part comprising the response signal and a code value selected in the interrogator station, and means effective to accept the response signal only on the finding of such identity.

2. The apparatus of claim 1 in which the means to determine identity at the interrogator station operate to determine whether the response is coded with a value within one unit of a selected value, one part of the code running cyclically.

3. The apparatus of claim 1 in which the means to determine identity at the responder station operate to determine whether the response is coded with a value within one unit of a selected value, one part of the code running cyclically.

4. Apparatus for transmitting the value of a single variable parameter from a responder station to an interrogator station making use of a two-part code in which the value is represented by one of a number of non-repeating coarse divisions and one of a number of repeating fine divisions, a pulse separation coding being used; such apparatus comprising, at the interrogator station, means to generate a pulse, means to feed such pulse directly to a transmitter, delay means having a number of settings, means to feed said pulse to said transmitter via said delay means, a single setting being selected; at the responder station means for receiving said coded signal, means to determine whether substantial identity exists between the code part identifying the received signal and the same code part representing the value of the variable parameter at the responding station, means to code a response signal with the other code part representing the value of the variable parameter to be transmitted, means to transmit such response signal and means effective to control such transmitting apparatus to activate same only on the finding of substantial identity.

5. The apparatus of claim 4 in which said means for determining whether substantial identity exists comprises a coincidence gate, means passing said signal after reception to one input of said coincidence gate, delay means having a number of settings, means to select a setting in accordance with the relevant code part of the variable parameter to be transmitted and means passing said pulse to the second input of said coincidence gate via said delay means and its selected setting.

6. The apparatus of claim 5 in which a plurality of settings are selected upon the delay means in order to provide that a spread of values will pass through the coincidence gate.

7. Apparatus for transmitting the value of height between an interrogator station and a responder station wherein the height is represented by a two digit code: such apparatus comprising, in the interrogator station, a transmitter to transmit an interrogation signal and means to code said interrogation signal by one of said two digits; at the responder station, means to receive the coded signal, means to determine whether substantial identity exists between the received digit and the corresponding digit for the value of the height of the responding station, means to generate a response signal, means to code such response signal with the other digit of the code for the height of the responder station, transmitting apparatus for said response signal and means to activate such transmitting apparatus in dependence upon finding said substantial identity.

References Cited in the file of this patent

UNITED STATES PATENTS

| | | |
|---|---|---|
| 2,719,284 | Roberts | Sept. 27, 1955 |
| 3,001,188 | Wild | Sept. 19, 1961 |

FOREIGN PATENTS

| | | |
|---|---|---|
| 143,298 | Australia | Sept. 10, 1951 |
| 497,204 | Canada | Oct. 27, 1953 |
| 499,348 | Canada | Jan. 19, 1954 |